Patented Aug. 20, 1935

2,012,177

UNITED STATES PATENT OFFICE

2,012,177

ARTIFICIAL MASSES AND PROCESSES OF PREPARING THEM

Arthur Voss and Ewald Dickhäuser, Frankfort-on-the-Main-Hochst, Germany, assignors to I. G. Farbenindustrie Aktiengesellschaft, Frankfort-on-the-Main, Germany, a corporation of Germany No Drawing. Application June 4, 1929, Serial No. 368,434. In Germany June 14, 1928

10 Claims. (Cl. 260—2)

The present invention relates to artificial masses and a process of preparing them.

A process of technical value for preparing polymerization products from a vinyl halide has not yet been known. The polymerized products hitherto obtained by exposing them to a short-wave light could only be produced by enclosing the vinyl halide which at ordinary temperature is in a gaseous state or in any case easily volatile, in a quartz tube and exposing the same either to the light of a quartz lamp or to sunlight while applying pressure; a process which cannot be carried out in a technically satisfactory manner.

We have now found that the polymerization of the vinyl halides is easily effected by starting from pure products and heating same at a very slowly increasing temperature under pressure while the temperature is raised to about 100° C. at the most and kept at this degree or also at a lower one, such as for instance at 60° C. to 80° C. until the polymerization is complete, which generally takes place after the lapse of about 6 to 10 hours. The progress of the polymerization is accelerated by the addition of a catalyst such as for instance superoxides which are also used for polymerizing organic vinyl esters, and furthermore by the action of short-wave light. The polymerized products differ according to the conditions under which the polymerization occurred. By heating them to a relatively high temperature there are obtained substances which are more readily soluble in organic solvents than those obtained at a low temperature.

The process may also be carried out in such a manner that the polymerization is effected in the presence of an organic solvent for the vinyl halide which does not take an active part in the polymerization, such as benzene, ethyl alcohol, ligroine, carbon tetrachloride, etc. The solvents have a certain effect upon the final product though they can be recovered quantitively and consequently do not participate in the synthesis of the polymerized products. By using an indifferent solvent the solubility of the polymerized product is increased. The selection of the different solvents has also a certain effect upon the solubility and the other physical property (viscosity) of the final product. According to the working conditions adopted polymerized products of almost any desired degree of solubility are obtained, that is to say such polymerized products can be obtained as are insoluble in nearly every solvent, furthermore such polymerized products as are easily soluble but only in a quite limited number of solvents, for instance in chlorbenzene furfurol, acetone, dioxane, cyclohexanone, and finally such polymerized products as are soluble in many solvents, especially also in aromatic hydrocarbons such as benzene.

The polymerization may however also be carried out in the presence of such substances which are also capable of being polymerized, such as for instance other vinyl compounds for example the vinyl esters of organic acids, also butadiene, styrol, acrylic acid, and so on. All these substances contain the group

and it is pointed out that, for convenience, the term "compounds containing the group

and being capable of being polymerized" is used in the claims to define these substances. It is a surprising fact that in this case the polymerization does not proceed in such a manner that the final product constitutes a mere mixture of the polymerized products of the respective components,—the final product possesses not even the properties which would have to be taken as the average of the properties of the various components—but there are generally formed products of specifically new properties.

The polymerized products thus obtained after being freed from any volatile constituents, for instance by distillation with water vapor or by treating them in vacuo, can be worked up like celluloid into commodities of the most varied kind. If the polymerization is carried out in a suitable manner the polymerized product is obtained in the desired form. As the polymerized product is capable of being softened, any desired shape may be given to it by pressing. The solid masses thus obtained may further be worked up by cutting, filing, sawing them etc. Furthermore the polymerized products may not only be worked up alone but also combined with any other substances, such as resins, oils, cellulose derivatives or filling materials of any kind.

The present invention constitutes a great technical progress because it permits to prepare in a technically satisfactory manner not only substances, which are already known, but also new substances of great value for various technical purposes.

The substances obtainable according to the present invention possess a high electric insulating power; they are, therefore, most valuable for electrotechnical purposes. They have the further advantage of being incombustible, which opens up to them a large field in electrotechnics, in the film industry and in the manufacture of commodities of any kind.

The following examples illustrate our invention, but they are not intended to limit it thereto, the parts being by weight:

(1) 75 parts of vinyl chloride and 25 parts of styrol are pressed into an autoclave, and 0,2 parts of benzoyl superoxide is added thereto; the bomb is then gradually heated, while stirring, first for 5 hours to 40° C.–50° C. and then for 15 hours to 60° C.–70° C. After cooling there exists almost no perceptible pressure. The contents of the bomb constitutes a whitish, partly pulverulent and partly vitreous mass. This mass can directly be worked up into the desired articles by heating it under pressure in suitable moulds; it also dissolves in suitable solvents for instance in a mixture of acetone and benzene and can then be used as a lacquer of excellent properties as to fastness. The lacquer layer thus obtainable is capable of resisting, in a high degree, any mechanical and chemical actions, it is elastic, fast to light, humidity, acids and alkalies.

(2) 60 parts of vinyl chloride and 40 parts of ethyl chloride are mixed while intensely cooling; this mixture is filled into an autoclave as referred to in Example 1 and left therein, first for 5 hours at a temperature of 40° C. then for 5 hours at a temperature of 60° C. and finally for 5 hours at a temperature of 80° C. The contents of the bomb consists in an elastic, perfectly transparent vitreous mass which after opening the bomb can be taken out as a compact block by some suitable means. The polymerized product can now be brought into any desired shape by cutting, pressing, if necessary while heating it. During the heating process which may conveniently be carried out in vacuo, the volatile constituents escape and thus there are obtained bodies of excellent solidity, insulating power and incombustibility.

(3) 40 parts of vinyl chloride are mixed with 60 parts of vinyl acetate as described in the preceding example and heated in like manner in a mould under pressure. The polymerized product thus obtained constitutes also an elastic, perfectly transparent body which can be worked up. By dissolving it in a mixture of cyclohexanone and benzene, a lacquer is obtained which yields, when used alone, excellent films, but which may also be combined with cellulose derivatives, resins, caoutchouc, etc.

(4) 100 parts of vinyl chloride are filled, while applying pressure, into a bomb whose inside is enamelled or lined with a noble metal. The bomb is then heated for several hours at 30° C., then for some hours successively at a temperature of 40° C., 50° C. and 60° C., during which operation the last temperature of 60° C. is maintained for 12 hours or even longer, the time being determined by the fact that the completion of the polymerization will be indicated by the decreasing pressure. The contents of the bomb consists of a white, very solid mass which is purified by dissolving it in chlorobenzene and reprecipitating it from benzene by alcohol. After drying a white powder is obtained which shows neither a dark coloration nor any sign of the splitting off of hydrogen chloride, but is perfectly fast to light and air. This powder can be worked up as set forth in the foregoing description, either alone or together with some filling material, into shaped artificial articles which are distinguished by their great resistance towards chemical and mechanical actions.

(5) 50 parts of vinyl chloride, 50 parts of butadiene and 50 parts of benzene are mixed and kept in an autoclave first for 4 hours at a temperature of 50° C., then for 4 hours at a temperature of 70° C. and finally for 6 hours at a temperature of 100° C. When the contents has cooled, it constitutes a vitreous, whitish mass of an excellent elasticity. It can be worked up directly into commodities like the product obtained according to the preceding example; it can also be used alone or combined with other crude lacquer substances for the preparation of lacquers.

(6) Vinyl bromide is kept in an autoclave into which a quartz lamp projects, first for two hours at a temperature of between 20° C. and 30° C., then for 2 hours at a temperature of between 30° C. and 40° C. and finally for 10 hours at a temperature of about 50° C. Thereupon the polymerization is complete. A whitish powder is obtained which dissolves in chlorobenzene, cyclohexanone, dioxane, furfurol, acetone alone or in a mixture of one of these solvents with another one of them or with some other solvent such as a hydrocarbon, a chlorinated hydrocarbon or the like.

We claim:

1. The process which comprises subjecting a vinyl halide to polymerization in the presence of styrol at a gradually rising temperature not exceeding 100° C. while applying pressure.

2. The process which comprises subjecting vinyl chloride to polymerization in the presence of styrol at a gradually rising temperature not exceeding 100° C. while applying pressure.

3. The process which comprises subjecting a vinyl halide to polymerization in the presence of styrol and benzoyl superoxide at a gradually rising temperature not exceeding 100° C., while applying pressure.

4. The process which comprises subjecting vinyl chloride to polymerization in the presence of styrol and benzoyl superoxide at a gradually rising temperature not exceeding 100° C., while applying pressure.

5. As a new product, the polymerization product of a mixture of vinyl chloride and styrol, said product being soluble in a mixture of acetone and benzene and being fast to light, humidity, acids and alkalies.

6. The process of polymerizing a vinyl halide which comprises heating the vinyl halide, while applying pressure, at each of several successively higher temperatures up to 100° C. and maintaining said halide for a substantial period of time at each of said successively higher temperatures.

7. The process of polymerizing a vinyl halide which comprises heating a solution thereof in an organic solvent, while applying pressure, at each of several successively higher temperatures up to 100° C. and maintaining said halide for a substantial period of time at each of said successively higher temperatures.

8. The process which comprises heating a vinyl halide in admixture with another compound containing the group

and being capable of being polymerized, while applying pressure, at each of several successively higher temperatures up to 100° C. and maintaining said mixture for a substantial period of time at each of said successively higher temperatures.

9. The process of polymerizing a mixture of vinyl chloride and vinyl acetate which comprises heating the mixture, while applying pressure, at each of several successively higher temperatures up to 100° C. and maintaining the mixture for a substantial period of time at each of said successively higher temperatures.

10. The process of polymerizing a vinyl halide which comprises heating it, while applying pressure, for an extended period by subjecting it to a temperature which gradually increases until an upper limit not in excess of 100° C. is reached and maintaining said halide at successively higher temperatures below the final temperature for the major portion of the heating period.

ARTHUR VOSS.
EWALD DICKHÄUSER.